(12) United States Patent
Fish (10) Patent No.: US 8,660,391 B1
(45) Date of Patent: Feb. 25, 2014

(54) HETEROGENEOUS WAVEGUIDE INTEGRATED OPTICAL ISOLATOR AND CIRCULATOR UTILIZING ONE OR MORE OPTICAL GRATING COUPLERS

(75) Inventor: Gregory Alan Fish, Santa Barbara, CA (US)

(73) Assignee: Aurrion, Inc., Goleta, CA (US)

( * ) Notice: Subject to any disclaimer, the term of this patent is extended or adjusted under 35 U.S.C. 154(b) by 107 days.

(21) Appl. No.: 13/249,804

(22) Filed: Sep. 30, 2011

(51) Int. Cl.
| G02B 6/00 | (2006.01) |
| G02B 6/34 | (2006.01) |
| G02F 1/01 | (2006.01) |
| H04B 10/17 | (2011.01) |
| H04J 14/02 | (2006.01) |

(52) U.S. Cl.
USPC .......................... 385/37; 385/11; 359/484.03

(58) Field of Classification Search
USPC .......... 385/33–37, 147, 11, 24, 39; 372/6, 25, 372/50.22; 359/484.03
See application file for complete search history.

(56) References Cited

U.S. PATENT DOCUMENTS

| 4,756,607 | A | * | 7/1988 | Watanabe et al. | ......... 359/484.03 |
| 4,962,506 | A | * | 10/1990 | Rahn et al. | ....................... 372/94 |
| 5,555,330 | A | * | 9/1996 | Pan et al. | ......................... 385/39 |
| 5,657,407 | A | * | 8/1997 | Li et al. | ............................. 385/37 |
| 6,018,534 | A | * | 1/2000 | Pan et al. | ........................... 372/6 |
| 6,061,484 | A | * | 5/2000 | Jones et al. | ..................... 385/24 |
| 6,154,581 | A | * | 11/2000 | Lu et al. | ............................ 385/11 |
| 6,724,955 | B2 | * | 4/2004 | Sasaki et al. | ..................... 385/24 |
| 6,807,338 | B2 | * | 10/2004 | Bouteiller et al. | ............. 385/37 |
| 7,095,772 | B1 | * | 8/2006 | Delfyett et al. | ............ 372/50.22 |
| 7,558,302 | B1 | * | 7/2009 | Delfyett et al. | ................. 372/25 |
| 2003/0108283 | A1 | * | 6/2003 | Ota et al. | ........................ 385/24 |
| 2007/0237446 | A1 | * | 10/2007 | Hirao et al. | ..................... 385/11 |

OTHER PUBLICATIONS

Bogaerts, Wim , "Heilos, Lecture: Coupling tight to silicon photon circuits, Version: Nov. 2009,", Silicon Photonics—PhD course prepared within FP7-224312 Helios project, (Nov. 2009), 114 pages.
Shimizu, et al,, "InGeAsP/InP evanescent mode waveguide optical isolators and their application to InGaAsP/InO/si hybrid evanescent optical isolators", Springer, Opt Quant Electron (2009) 41:653-660, DOI 10.1007/s11082-010-9373-3, Springer Science+Business Media, LLC. 2010, published online: Mar. 7, 2010, 653-660.
Sugimoto, et al., "A Hybrid Integrated Waveguide Isolator on a Silica-Based Planar Lightwave Circuit", Journal of Lightwave Technology, vol. 14, No. 11, Nov. 1996, IEEE 1996, 2537-2546.

* cited by examiner

*Primary Examiner* — Akm Enayet Ullah
(74) *Attorney, Agent, or Firm* — Blakely, Sokoloff, Taylor & Zafman (57) ABSTRACT

Embodiments of the invention utilize optical structures created by processes in the wafer fabrication foundry to form optical isolators and circulators. Grating coupling structures are utilized to couple light having a chosen polarization component into free space through non-reciprocal rotation material; said light is captured by another set of grating coupling structures after experiencing a 45 degree rotation of the polarization. By non-reciprocally rotating the polarization, the input and output ports of the optical isolator will be different depending on the direction of the light propagation.

The amount of non-reciprocal rotation material utilized by embodiments of the invention may be small, and the grating coupling structures may be efficiently made to couple to each other as their field profiles may be matched and their position may be precisely defined by lithographic means.

15 Claims, 15 Drawing Sheets

HETEROGENEOUS WAVEGUIDE INTEGRATED OPTICAL ISOLATOR AND CIRCULATOR UTILIZING ONE OR MORE OPTICAL GRATING COUPLERS

TECHNICAL FIELD

This disclosure relates generally to the field of photonics, and in particular but not exclusively, relates to optical isolators.

BACKGROUND

An optical isolator is an optical component designed to allow a beam of light to pass through the component in a principle direction, and to prevent a beam of light from passing through the component in the opposite of the principle direction. Optical isolators may be used, for example, to prevent laser diode self-oscillation (i.e., prevent feedback from entering a laser cavity).

Figure 1:
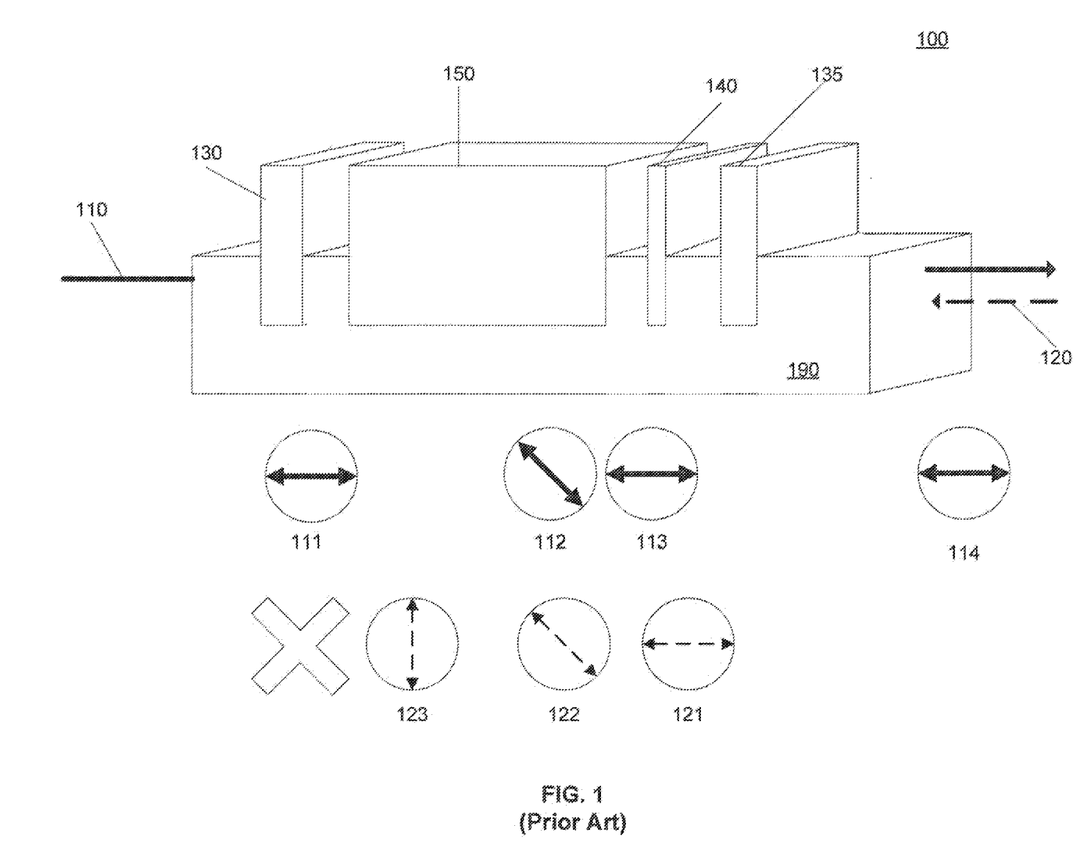
FIG. 1 is a block diagram of a prior art optical isolator.

FIG. 1 is a block diagram of a prior art of an integrated optical isolator. In this illustration, optical isolator 100 is shown to include TE polarizers 130 and 135, quarter wave-plate 140 and non-reciprocal polarization rotator 150. Operation of isolator 100 is shown via light 110 and 120.

Light 110 is shown as traveling in the principle direction. The principle direction may be the direction of light that exits a laser cavity (not shown). In this example, light 110 comprises TE polarized light (i.e., s-polarized light), and this light passes through TE polarizer 130 (shown as light state 111). Said light is rotated by non-reciprocal rotator 150 45° with a right-hand screw motion (shown as light state 112), and subsequently rotated by quarter wave-plate 140 45° with a left-hand screw motion (shown as light state 113); thus, light 110 is still TE polarized light at this state. Light 110 passes through TE polarizer 135 and out of optical isolator 100 (shown as light state 114).

Light 120 is shown as traveling through optical isolator 100 in the opposite of the principle direction. In this example, light 120 is TE polarized light, and this light passes through TE polarizer 135 (shown as light state 121). Said light is rotated by quarter wave-plate 140 45° with a left-hand screw motion (shown as light state 122), and is subsequently rotated by non-reciprocal rotator 150 45° with a left-hand screw motion again (shown as light state 123); thus light 170 has been rotated to be TM polarized light (i.e., p-polarized light). This light is blocked by TE polarizer 130. Thus, optical isolator 100 has prevented light 120 from traversing the optical isolator in the opposite of the principle direction.

The above described prior art solution requires discrete optical components 130, 135, 140 and 150 that are relatively large compared to the other integrated photonic components. Furthermore, the addition of these discrete optical components requires cutting through substrate 190 and aligning these prefabricated components one at a time, increasing manufacturing complexity.

DESCRIPTION OF THE DRAWINGS

Non-limiting and non-exhaustive embodiments of the invention are described with reference to the following figures, wherein like reference numerals refer to like parts throughout the various views unless otherwise specified. It should be appreciated that the following figures may not be drawn to scale.

Descriptions of certain details and implementations follow, including a description of the figures, which may depict some or all of the embodiments described below, as well as discussing other potential embodiments or implementations of the inventive concepts presented herein. An overview of embodiments of the invention is provided below, followed by a more detailed description with reference to the drawings.

SPECIFICATION

Embodiments of an apparatus, system and method to utilize a heterogeneous waveguide optical isolator and circulator are described herein. In the following description numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Embodiments of the invention utilize optical structures created by processes in the wafer fabrication foundry to form optical isolators. For example, waveguide grating couplers may be utilized to vertically couple light having a chosen polarization component into free space through non-reciprocal rotation material; this light is captured by another set of grating structures after experiencing a 45° rotation of the polarization. In some embodiments, the waveguide grating structures are designed to image the optical mode of the input waveguide to the output waveguide. By non-reciprocally rotating the polarization, the input and output ports of the isolator will be different depending on the direction of the propagation through the structure.

Embodiments of the invention are able to be constructed at an extremely small size (<0.1 mm×0.1 mm) compared to prior art solutions (such as the prior art solution illustrated in FIG. 1). The amount of non-reciprocal rotation material utilized by embodiments of the invention may be very small, and the photonic grating coupling structures may be very efficiently made to couple to each other as their optical field profiles may be matched and their position may be very precisely defined by lithographic means.

Figure 2A:
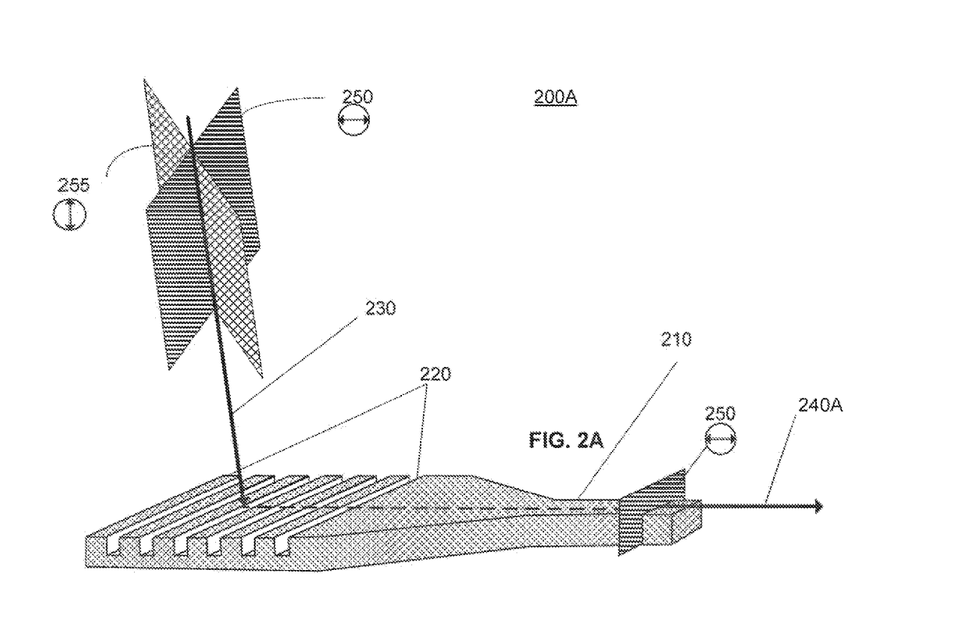
FIG. 2A-2B are diagrams of grating couplers according to embodiments of the disclosure.

FIG. 2A-2B are diagrams of grating couplers according to embodiments of the disclosure. Coupler 200A includes gratings 220 to selectively couple light having a specific polarization into waveguide 210. In this embodiment, gratings 220 are shown to couple TE-polarized light 250 (of light 230, which has multiple polarization components) into said waveguide; TM-polarized light 255 is thus not coupled by said gratings into waveguide 210. Thus, output light 240A will comprise TE-polarized light.

Figure 2B:
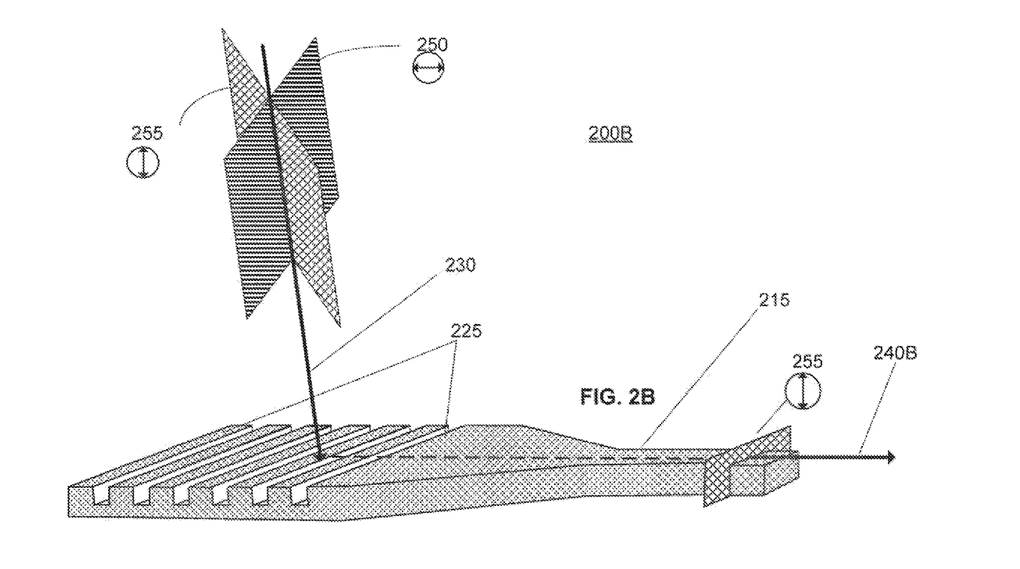

Coupler 200B includes gratings 225 to couple TM-polarized light 255 into waveguide 215; thus, in this illustration, TE-polarized light 250 is not coupled by the gratings into the waveguide. Thus, output light 240B will comprise TM-polarized light. It is to be understood that gratings 220 and 225 will each have different parameters in order to couple light having a chosen polarization component into their respective waveguides (e.g., gratings 225 may have a larger pitch that gratings 220).

Figure 3:
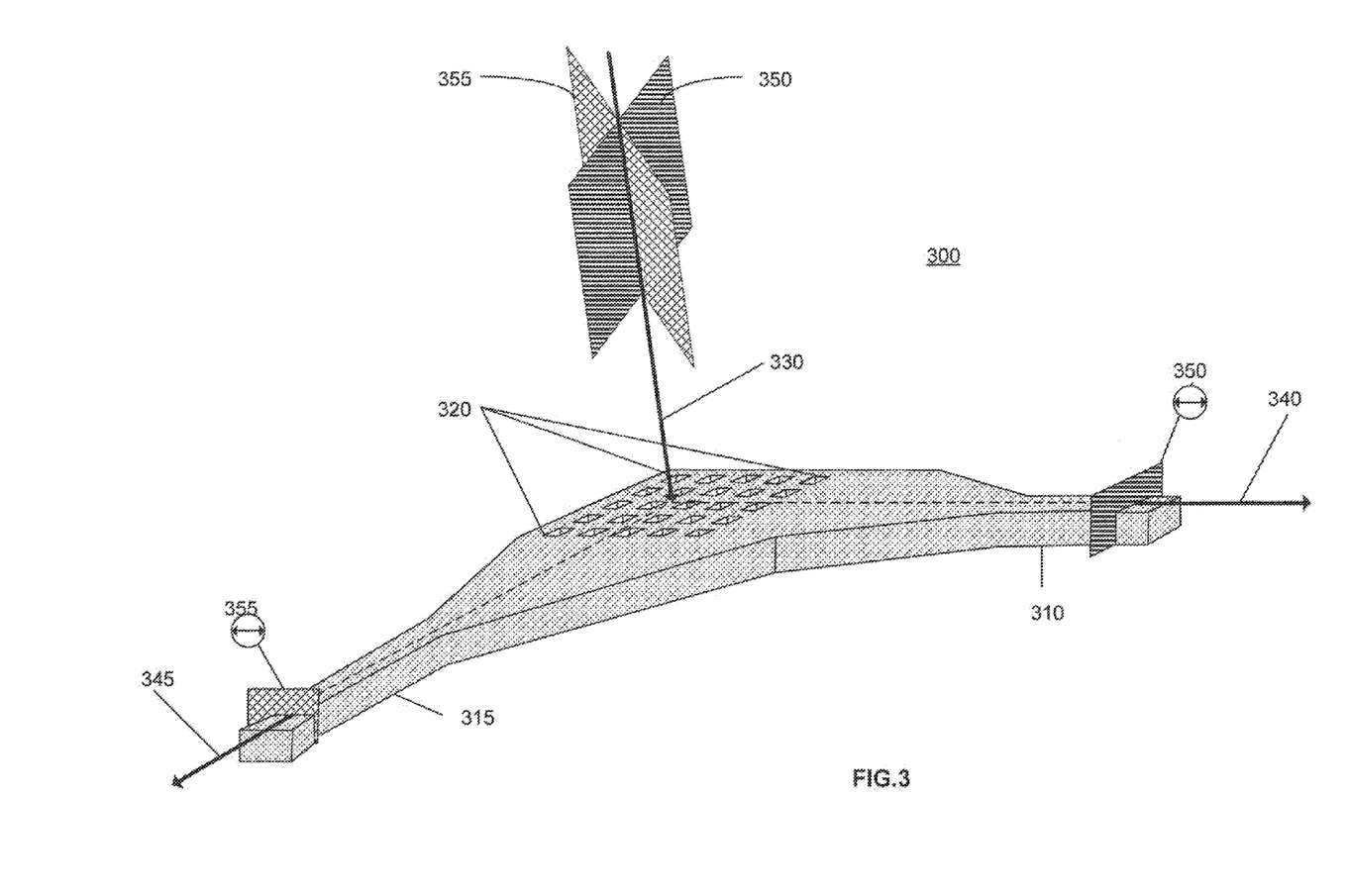
FIG. 3 is an illustration of a two-dimensional (2D) grating coupler and splitter according to an embodiment of the disclosure.

FIG. 3 is an illustration of a two-dimensional (2D) grating coupler and splitter according to an embodiment of the disclosure. In this embodiment, 2D grating coupler and splitter 300 includes gratings 320, which are configured to couple TE-polarized light 350 into waveguide 310, TM-polarized light 355 into waveguide 315, thereby splitting the polarization components of light 330.

As shown in this illustration, light 340 output from waveguide 310 has TE-polarization with respect to the waveguide; however light 345 output from waveguide 315 has TE-polarization with respect to the waveguide, due to the orientation of waveguide 315 with respect to the light received at gratings 320. Thus, the TM and TE polarization components of light 330 will have the same polarization in waveguides 310 and 315, respectively, when said light is split by gratings 320.

Figure 4A:
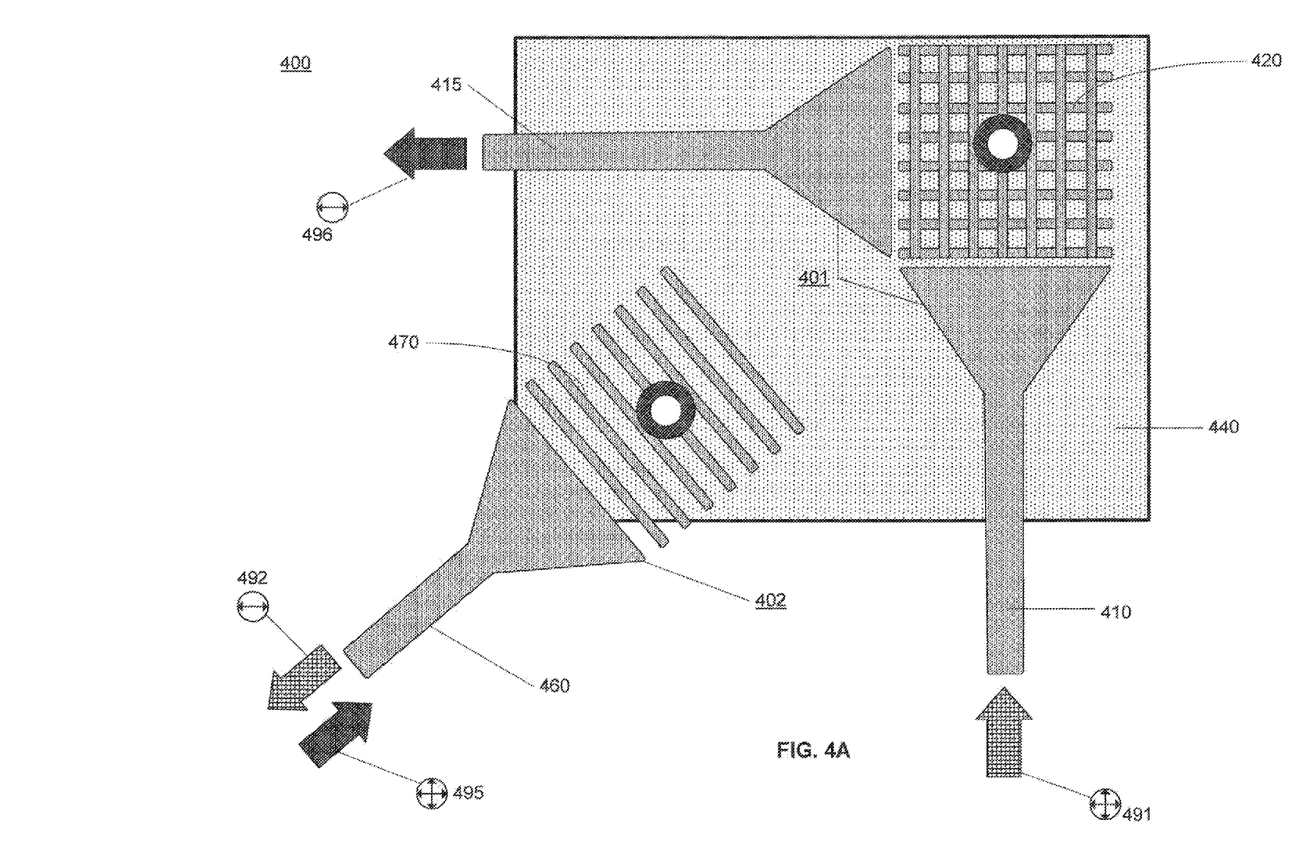
FIG. 4A-4G are illustrations of an optical isolator according to an embodiment of the disclosure.

FIG. 4A-4G are illustrations of an optical isolator according to an embodiment of the disclosure. FIG. 4A illustrates a bottom-view of optical isolator 400, illustrated as having waveguides 410, 415 (of 2D grating coupler and splitter 401 including gratings 420) and 460 (of grating coupler 402 including gratings 470). Waveguides 410 and 415 of optical isolator 400 each only allow light to propagate at a specific direction—i.e., in this embodiment, light may only enter waveguide 410, and light may only exit waveguide 415, due to the configuration of the components of optical isolator 400 as described below.

Figure 4B:
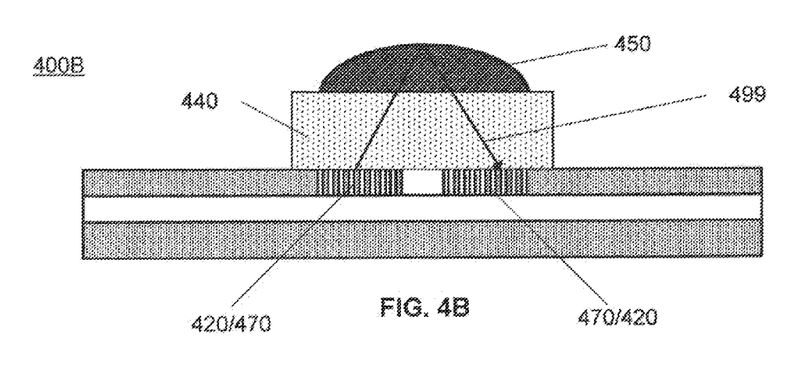
Figure 4C:
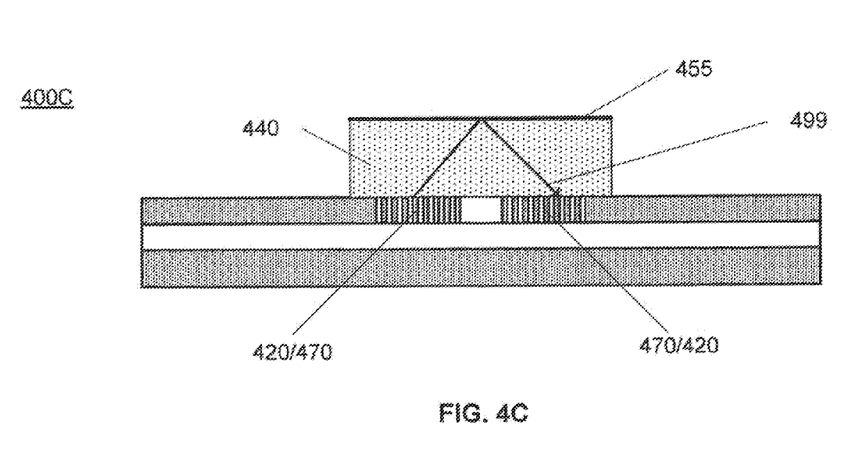

Reflective non-reciprocal rotator 440 will rotate light 45° in the right-hand screw direction. FIG. 4B and FIG. 4C are cross-sectional views of optical isolator 400 according to embodiments of the invention. Gratings 420/470 may direct light substantially normal to the surface of non-reciprocal rotator 440. In this embodiment, non-reciprocal rotator 440 is a 22.5° Faraday rotator (i.e., a Faraday Mirror).

In the illustrated embodiment of FIG. 4B, reflective lens 450 is disposed on top of rotator 440 to reflect light 499 such that it passes "twice" in the principle direction of the rotator so that the light is rotated 45°. Thus, the amount of Faraday rotator material may be very small compared to prior art solutions. As shown in the illustrated embodiment FIG. 4C, any reflective means 455 may be disposed on top of rotator 440 so that light 499 passes "twice" in the principle direction of rotator 440 to rotate the light 45°.

Figure 4D:
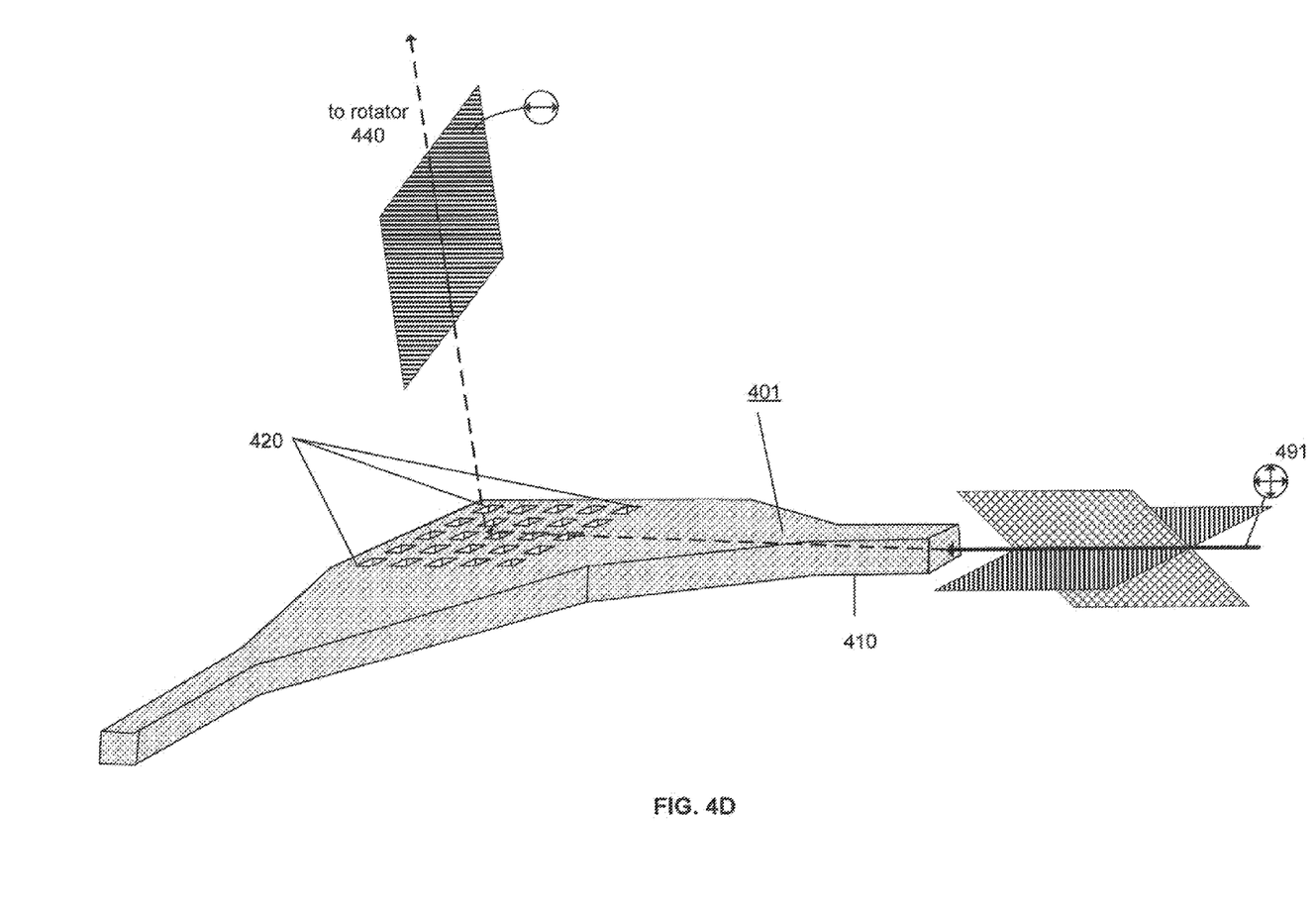

FIG. 4D is an illustration of light entering optical isolator 400 via waveguide 410 of grating/splitter 401. In this embodiment, light 491 is shown as having TE and TM polarization components. Gratings 420 are configured to only reflect TE-polarized light normal towards rotator 440, where TE-polarized light will subsequently be rotated +45°.

Figure 4E:
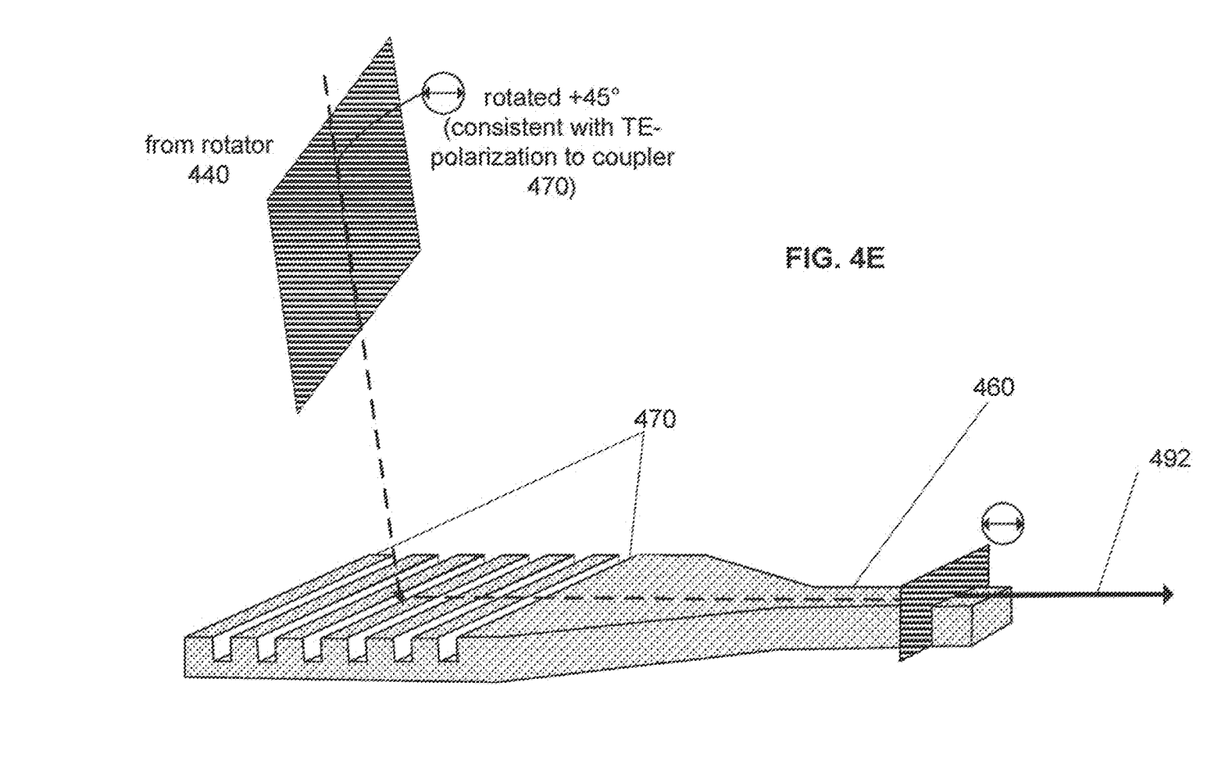

FIG. 4E is an illustration of light exiting optical isolator 400 via waveguide 460. In this embodiment, light 492, rotated +45° as described above, is consistent with TE-polarization to gratings coupler 402 (i.e., gratings 470 and waveguide 460), due to placement of gratings coupler 402 with respect to 2D grating coupler and splitter 401 (as illustrated in FIG. 4A). Thus, gratings 470, which are configured to reflect only TE-polarized light (i.e., similar to gratings coupler 300A of FIG. 3A) reflect light 492 from rotator 440, and said light exits optical isolator 400 via waveguide 460.

Figure 4F:
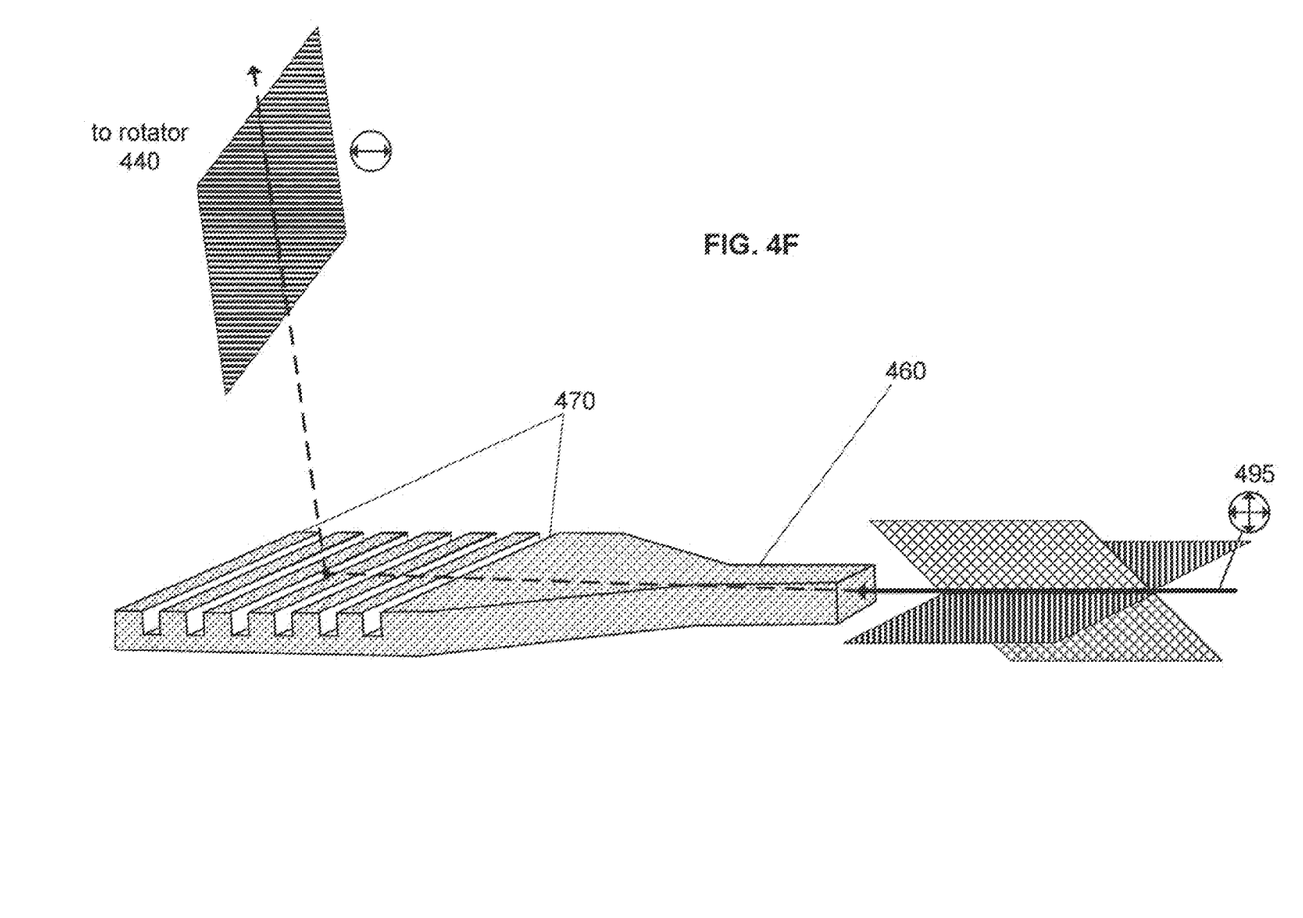

FIG. 4F is an illustration of light entering optical isolator 400 via waveguide 460 of grating coupler 402. In this embodiment, light 495 is shown as having TE and TM polarization components. As discussed above, gratings 470 are configured to only reflect TE-polarized light normal towards rotator 440, where TE-polarized light is rotated +45°.

Figure 4G:
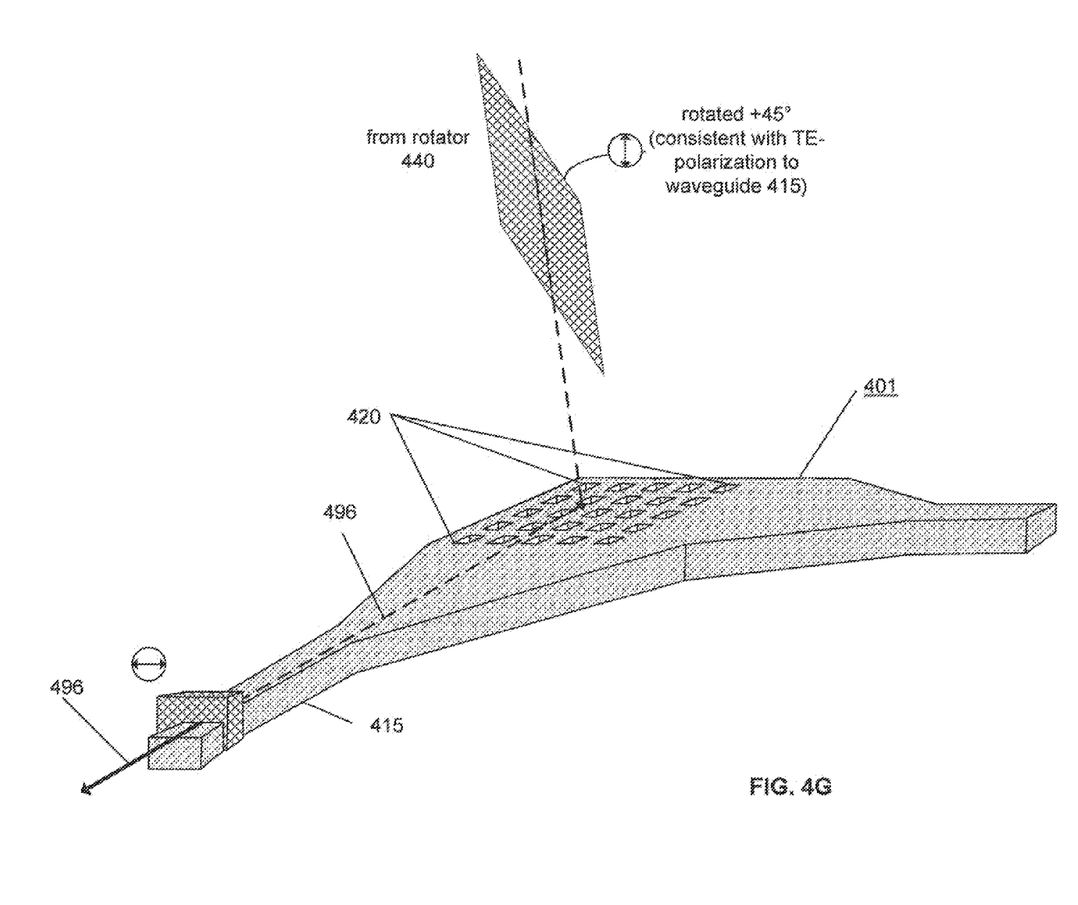

FIG. 4G is an illustration of light exiting optical isolator 400 via waveguide 415. In this embodiment, light 496, while rotated +45°, is consistent with TE-polarization to waveguide 415 of 2D grating coupler and splitter 401, and said light exits optical isolator 400 via waveguide 415.

Thus, any light received by 2D grating coupler and splitter 401 exits via waveguide 415, and any light entering 2D grating coupler and splitter 401 must do so via waveguide 410 in order to exit optical isolator 400 (i.e., via waveguide 460 as described above).

Figure 5A:
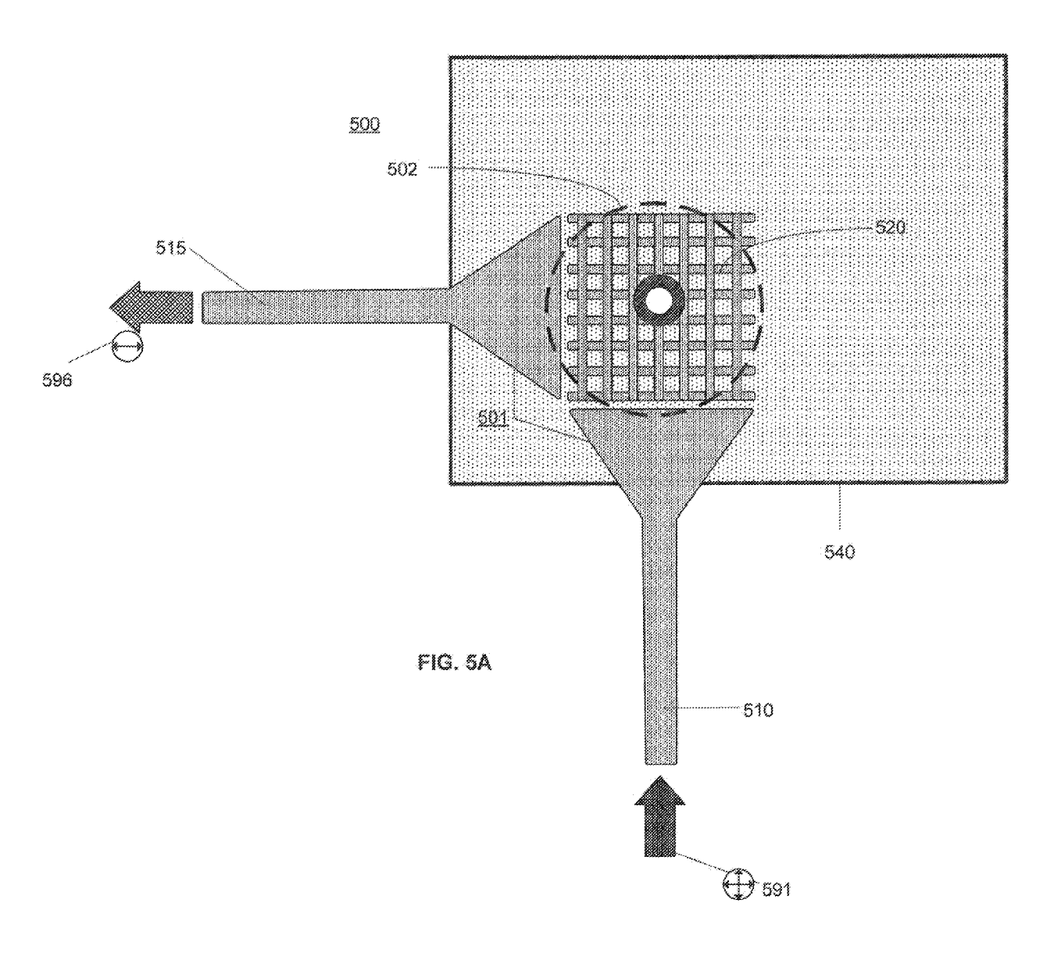
FIG. 5A-5B are illustrations of a fiber polarizing optical isolator according to an embodiment of the disclosure.

FIG. 5A-5B are illustrations of a fiber polarizing optical isolator according to an embodiment of the disclosure. In this embodiment, optical isolator 500 includes 2D grating coupler and splitter 501 (similar to 2D grating coupler and splitter 401). Waveguides 510 and 515 of optical isolator 500 each only allow light to propagate through at a specific direction (i.e., light may only enter waveguide 510, and light may only exit waveguide 515, due to the configuration of the components of optical isolator 500 as described below).

Figure 5B:
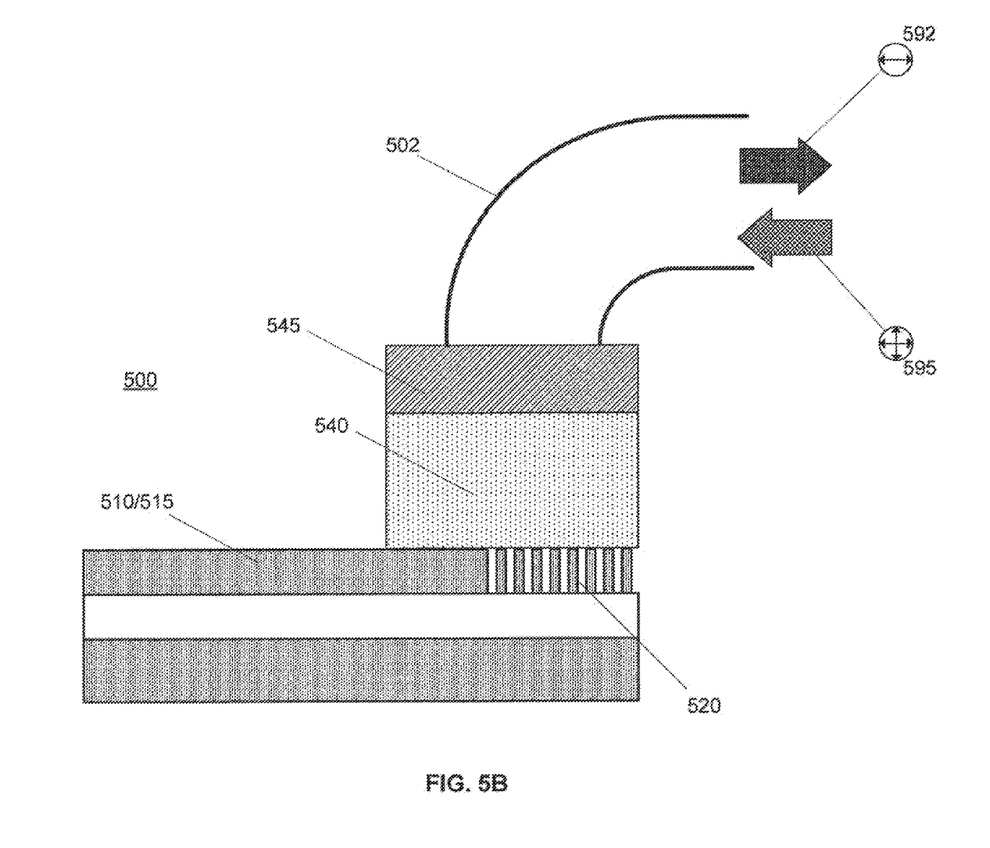

In this embodiment, gratings 520 direct light substantially normal to the surface of non-reciprocal rotator 540, which will rotate light 45° in the right-hand screw direction (i.e., +45° as light traverses "up" towards +45° polarizer 545 (as shown in the cross-sectional view of optical isolator 500 in FIG. 5B). TE-polarized light reflected from gratings 520 is rotated 45° in the right-hand screw direction to +45°, and thus passes through +45° polarizer 545 and enters fiber 502; it is to be understood that any light passed from waveguide 515 is rotated in the right-hand screw direction to −45° and is blocked by +45° polarizer 545.

As shown in the cross-sectional view of optical isolator 500 in FIG. 5B, fiber 502 is coupled to +45° polarizer 545, and may transmit light 595 towards gratings 520. Only +45° polarized light is to enter non-reciprocal rotator 540, due to +45° polarizer 545. Non-reciprocal rotator 540 may be any rotator which will rotate light 45°, for example, a Faraday rotator, or a quarter wave plate.

+45° polarized light passed from polarizer 545 is rotated 45° in the left-hand screw direction to +90° (i.e., TM-polarized light). This will exit waveguide 515 of 2D grating coupler and splitter 501. Thus, any light received by 2D grating coupler and splitter 501 exits via waveguide 515, and any light entering 2D grating coupler and splitter 501 must do so via waveguide 510 in order to exit optical isolator 500 (i.e., via fiber 502 as described above).

Figure 6A:
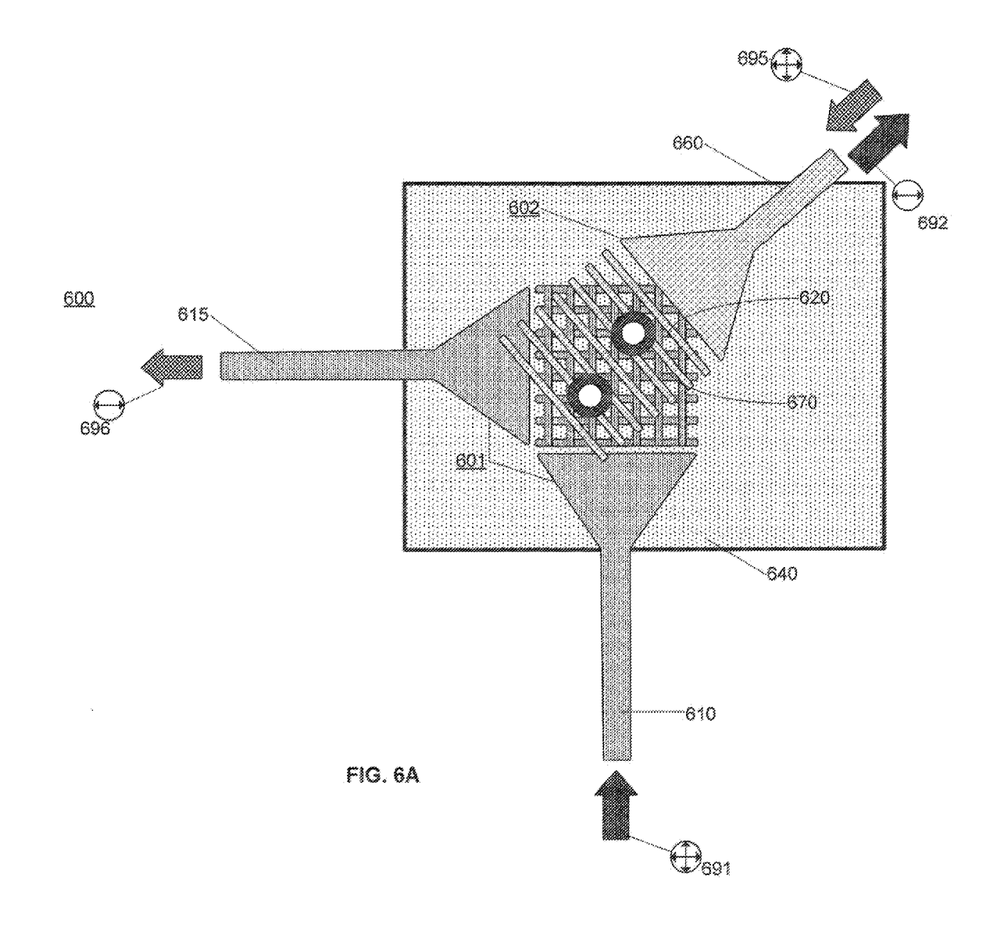
FIG. 6A and FIG. 6B are illustrations of an optical isolator according to an embodiment of the disclosure.
Figure 6B:
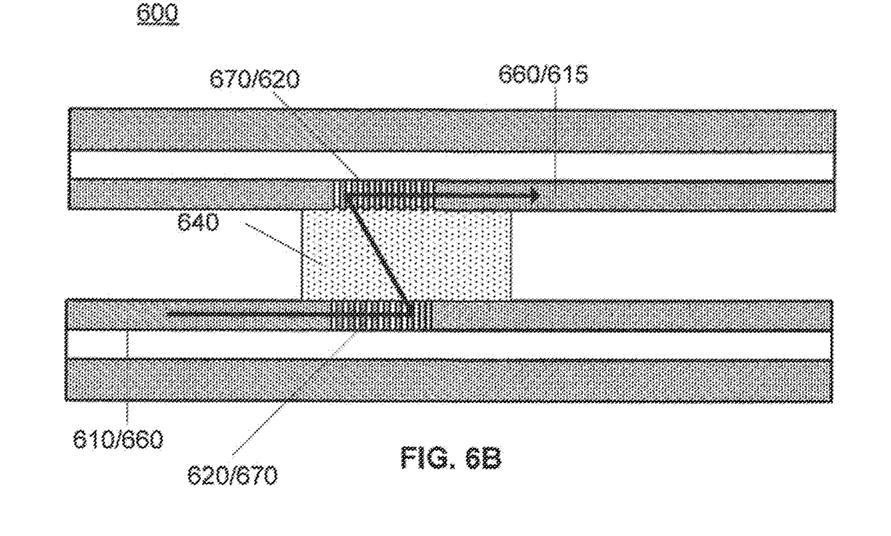

FIG. 6A and FIG. 6B are illustrations of an optical isolator according to an embodiment of the disclosure. Optical isolator 600 is illustrated as having 2D grating coupler and splitter 601 and grating coupler 602.

The top view of optical isolator 600 illustrated in FIG. 6A shows that configuration of the waveguides of the optical isolator is similar to the embodiment illustrated in FIG. 4A, wherein the transmission of light via waveguide 610 is limited to the "input" direction, the transmission of light via waveguide 615 is limited to the "output" direction. In this embodiment however, rotator 640, as illustrated in cross section of optical isolator 600 in FIG. 6B, is a 45° non-reciprocal rotator (similar to rotator 545 of the embodiment illustrated in FIG. 5B). Thus, as shown in FIG. 6B, gratings 620 and 670 may be disposed on opposing sides of rotator 640, creating an optical isolator having an extremely small size compared to prior art solutions.

Figure 7A:
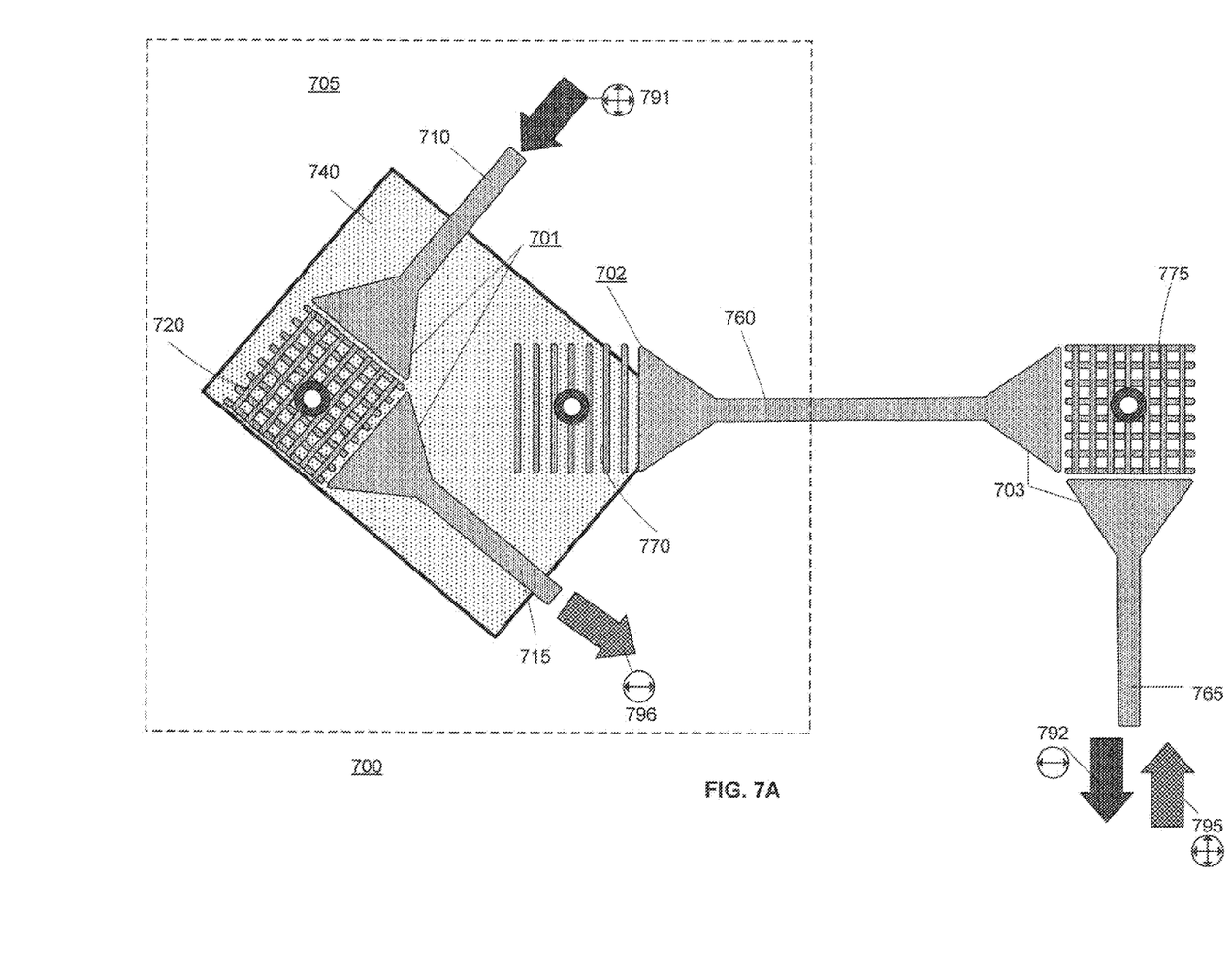
FIG. 7A and FIG. 7B are illustrations of an optical circulator according to an embodiment of the disclosure.
Figure 7B:
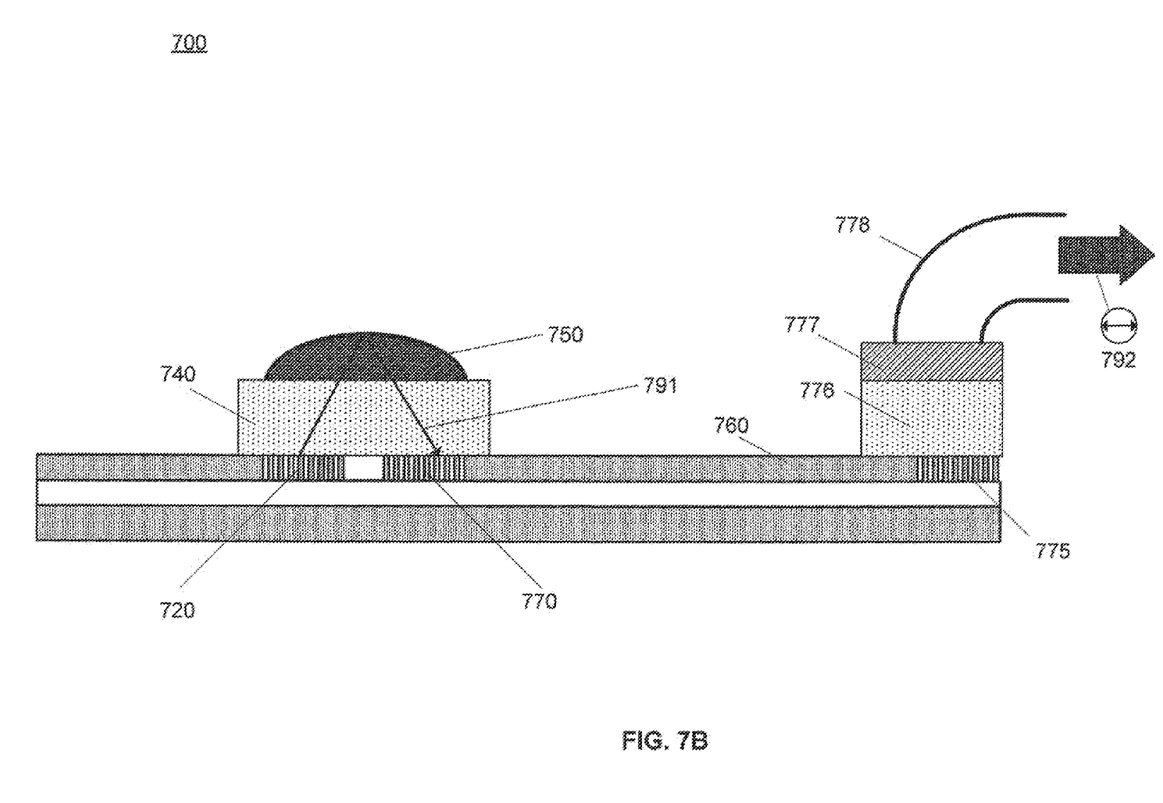

FIG. 7A and FIG. 7B are illustrations of an optical circulator according to an embodiment of the disclosure. It is understood that an optical circulator is an optical device that typically has at least three ports for accepting optical signals. In a three-port optical circulator, such as optical circulator 700, light that enters the circulator through a first port exits through a second port, and light that enters the circulator through the second port exits through a third port.

In this embodiment, optical circulator 700 includes optical isolator 705, which is configured similar to the optical isolator of FIGS. 4A-4G. Said optical isolator includes 2D grating coupler and splitter 701, wherein the transmission of light via waveguide 710 is limited to the "input" direction, while the transmission of light via waveguide 715 is limited to the "output" direction.

Optical isolator 705 utilizes non-reciprocal rotator 740. As shown in the cross-sectional illustration of FIG. 7B, non-reciprocal rotator 740 is a 22.5° Faraday rotator. Reflective lens 745 is disposed on top of rotator 740 to reflect light 799 such that it passes "twice" in the principle direction of the rotator so that the light is rotated 45°.

Optical circulator 700 further includes 2D grating coupler and splitter 703 operatively coupled to fiber 778 (via rotator 776 and polarizer 777). It is understood that optical circulators, such as optical circulator 700, are inherently non-reciprocal optical devices, since light that enters through waveguide 710 will exit through fiber 778, but if that light is subsequently reflected back from the fiber, it does not retrace its path back to waveguide 710, but exits through waveguide 715 instead. Thus, in this embodiment optical circulator 700 allows fiber 778 to be used for both receiving and transmitting light. Waveguide 710 may be coupled to a light transmitter, and light is sent from the transmitter to fiber 778. Incoming light from fiber 778 may simultaneously enter isolator 705 and be directed to waveguide 715, which may be further coupled to a receiver. Thus, optical circulator 700 allows single fiber 760 to support bi-directional optical transmissions. Similar to the embodiments of the invention described above, the use of waveguide grating structures and minimal non-reciprocal rotation material allows optical circulator 700 to be very small compared to prior art solutions.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize (such as, for example, utilizing TM grating couplers and −45° rotators in optical isolators and circulators according to other embodiments of the invention).

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

The invention claimed is:

1. An optical isolator comprising:
   a first optical grating coupler to receive light from a first waveguide and to direct light having a polarization component substantially normal to a surface of the first optical grating coupler that is parallel to the first waveguide;
   a non-reciprocal polarization rotator to receive light from the first optical grating coupler at a first surface and to rotate the polarization of the light at a principle direction;
   a reflecting surface to reflect the rotated light at a second surface of the non-reciprocal polarization rotator; and
   a second optical grating coupler positioned to receive the rotated light from the non-reciprocal polarization rotator at the first surface and to direct the received light to one of a plurality of output waveguides based on the polarization of the received light, the second optical grating coupler to receive light substantially normal to a surface of the second optical grating coupler that is parallel to the plurality of output waveguides.

2. The optical isolator of claim 1, wherein the non-reciprocal polarization rotator comprises a Faraday rotator.

3. The optical isolator of claim 1, wherein the second coupler to receive the light rotated 45 degrees in the principle direction.

4. The optical isolator of claim 1, wherein the reflecting surface comprises a lens.

5. An optical isolator comprising:
   a first optical grating coupler to receive light from a first waveguide and to direct light having a polarization component substantially normal to a surface of the first optical grating coupler that is parallel to the first waveguide;
   a non-reciprocal polarization rotator to receive the light at a first surface and to rotate the polarization of the light at a principle direction; and
   a second optical coupler, disposed on a second surface of the non-reciprocal rotator opposing the first surface and the first optical grating coupler, to receive the light received from the non-reciprocal polarization rotator and to direct the light to one of a plurality of output waveguides based on the polarization of the received light, the second optical grating coupler to receive light substantially normal to a surface of the second optical grating coupler that is parallel to the plurality of output waveguides.

6. The optical isolator of claim 5, wherein the non-reciprocal polarization rotator comprises a Faraday rotator.

7. The optical isolator of claim 5, wherein the second optical coupler comprises a second optical grating coupler.

8. The optical isolator of claim 5, wherein the second optical coupler comprises an optical fiber.

9. The optical isolator of claim 5, wherein the second optical coupler to receive the light rotated 45 degrees in the principle direction.

10. The optical isolator of claim 9, wherein the non-reciprocal rotator comprises a quarter-wave plate.

11. An optical circulator having a plurality of ports, comprising:
    an optical fiber;
    an optical isolator including:
      a first optical grating coupler to receive light from a first waveguide and to direct light having a polarization component substantially normal to a surface of the first optical grating coupler that is parallel to the first waveguide;

a non-reciprocal polarization rotator to receive light from the first coupler at a first surface and to rotate the polarization of the light at a principle direction;

a reflecting surface to reflect the rotated light at a second surface of the non-reciprocal polarization rotator; and a second optical grating coupler positioned to receive the rotated light from the non-reciprocal polarization rotator at the first surface and to direct the received light to one of a plurality of output waveguides based on the polarization of the received light, the second optical grating coupler to receive light substantially normal to a surface of the second optical grating coupler that is parallel to the plurality of output waveguides; and an optical fiber port to transmit the light between the optical fiber and the optical isolator.

12. The optical circulator of claim 11, wherein the non-reciprocal polarization rotator of the optical isolator comprises a Faraday rotator.

13. The optical isolator of claim 11, wherein the optical fiber port comprises a two-dimensional (2D) grating coupler and splitter.

14. The optical isolator of claim 11, wherein the second optical grating coupler of the optical isolator to receive the first light rotated 45 degrees in the principle direction.

15. The optical isolator of claim 11, wherein the reflecting surface of the optical isolator comprises a lens.

\* \* \* \* \*